(12) United States Patent  (10) Patent No.: US 9,316,769 B2
Chang et al.  (45) Date of Patent: Apr. 19, 2016

(54) OPTICAL FILM

(75) Inventors: Jun Won Chang, Daejeon (KR); Dae Hee Lee, Daejeon (KR); Moon Soo Park, Daejeon (KR); Sergey Belyaev, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/242,326

(22) Filed: Sep. 23, 2011

(65) Prior Publication Data

US 2012/0075568 A1   Mar. 29, 2012

Related U.S. Application Data

(63) Continuation of application No. PCT/KR2011/005469, filed on Jul. 25, 2011.

(30) Foreign Application Priority Data

Jul. 23, 2010  (KR) .......................... 10-2010-0071560

(51) Int. Cl.
*G02B 5/30* (2006.01)
*G02F 1/1335* (2006.01)
*C09K 19/52* (2006.01)

(52) U.S. Cl.
CPC ........ *G02B 5/3016* (2013.01); *G02F 1/133536* (2013.01); *B32B 2457/202* (2013.01); *C09K 19/52* (2013.01)

(58) Field of Classification Search
None
See application file for complete search history.

(56) References Cited

U.S. PATENT DOCUMENTS

| 6,995,816 | B2* | 2/2006 | Mi et al. ........................ 349/96 |
| 7,019,903 | B2* | 3/2006 | Berger et al. ............ 359/487.04 |
| 7,304,147 | B2* | 12/2007 | Sadamitsu et al. ............ 534/704 |
| 7,381,348 | B2* | 6/2008 | Khan et al. ............... 252/299.01 |
| 2004/0125430 | A1* | 7/2004 | Kasajima et al. ............. 359/247 |
| 2004/0209056 | A1* | 10/2004 | Oguri ............................ 428/212 |
| 2004/0232394 | A1 | 11/2004 | Khan et al. |

FOREIGN PATENT DOCUMENTS

| CN | 1413969 A | 4/2003 |
| CN | 1478208 A | 2/2004 |
| CN | 1774480 A | 5/2006 |
| JP | 2001517329 A | 10/2001 |
| JP | 2004528603 A | 9/2004 |
| JP | 200549698 A | 2/2005 |
| JP | 2005531636 A | 10/2005 |
| JP | 200679030 A | 3/2006 |
| JP | 2007156322 A | 6/2007 |

(Continued)

OTHER PUBLICATIONS

Office Action issued in Taiwanese Patent Application No. 100126211 on Aug. 8, 2013 along with English translation, 16 pages.

(Continued)

*Primary Examiner* — Gwendolyn Blackwell
*Assistant Examiner* — Anthony J Frost
(74) *Attorney, Agent, or Firm* — Rothwell, Figg, Ernst & Manbeck, P.C.

(57) ABSTRACT

An optical film, a reflective polarizing plate and a display device are provided. For example, the optical film may be used in the reflective polarizing plate which may enhance the efficiency of light utilization of a display device such as a liquid crystal display device and improve the brightness.

17 Claims, 8 Drawing Sheets

(56) References Cited

FOREIGN PATENT DOCUMENTS

| | | |
|---|---|---|
| JP | 2008249996 A | 10/2008 |
| JP | 2009122574 A | 6/2009 |
| JP | 2009244770 A | 10/2009 |
| JP | 2009251442 A | 10/2009 |
| WO | 2004003599 A2 | 1/2004 |

OTHER PUBLICATIONS

Office Action issued in Chinese Patent Application No. 201180036138.1 on Aug. 5, 2014 along with English translation, 19 pages.

* cited by examiner

OPTICAL FILM

CROSS-REFERENCE TO RELATED APPLICATION

This application is a continuation application of International Application PCT/KR2011/005469, with an international filing date of Jul. 25, 2011, which claims priority to and the benefit of Korean Patent Application No. 2010-0071560, filed Jul. 23, 2010, the disclosure of which is incorporated herein by reference in its entirety.

BACKGROUND

1. Field of the Invention

The present invention relates to an optical film, a reflective polarizing plate and a display device.

2. Discussion of Related Art

Brightness is a physical property representing brightness per unit area of a light source and a factor that determines the performance of a display device. A representative way to enhance the brightness of a display device includes a method of increasing the intensity of a light source and a method using an optical film for improving the brightness.

For example, a liquid crystal display device (LCD) displays an image by transmitting light emitted from a light source, such as a backlight unit (BLU), which is disposed at a lower portion of a liquid crystal panel, through the panel. In this process, a considerable amount of the light emitted from the light source is absorbed by a polarizing plate attached to a liquid crystal panel, resulting in decreases in efficiency of light utilization and brightness. As one alternative method used to solve these problems, a method using a film as an optical film for improving brightness was designed to reflect light that is not transmitted through the polarizing plate among the light emitted from the light source toward the light source and reuse the reflected light.

SUMMARY OF THE INVENTION

The present invention is directed to an optical film, a reflective polarizing plate and a display device.

According to one embodiment of the invention, there is provided an optical film that includes an anisotropic layer including a dichroic dye which is capable of forming a lyotropic liquid crystal (LLC) phase. In the above, an absolute value of the difference between the refractive index with respect to light that has wavelength within the range of visible light and that has polarized axis in a direction parallel to an optical transition dipole moment of an anisotropically absorbing fragment of the dichroic dye and the refractive index with respect to light that has wavelength within the range of visible light and that has polarized axis in a direction perpendicular to an optical transition dipole moment of an anisotropically absorbing fragment of the dichroic dye is 0.2 or more.

Hereinafter, the optical film will be described in detail.

In one embodiment, the optical film may be used as a brightness enhancement film. The term "brightness enhancement film" as used herein may refer to a functional film capable of enhancing the efficiency of light utilization by selectively transmitting or selectively reflecting incident light.

In this specification, the term "vertical," "horizontal," "perpendicular" or "parallel" as used for defining an "angle" may means that one member is substantially vertical, horizontal, perpendicular or parallel to another member within an angle range at which the desired purposes are not adversely affected. For example, the manufacturing errors and variations may be included in the above terms. Therefore, the terms may, for example, include an error of approximately ±15 degrees, preferably approximately ±10 degrees, and more preferably approximately ±5 degrees.

The term "lyotropic liquid crystal (LLC)" as used herein may refer to a material showing liquid crystal phase within a certain compositional or concentration ranges.

The term "dichroic dye" as used herein may refer to a substance capable of anisotropic absorption of electromagnetic radiation in certain wavelengths range, for example, may refer to a substance capable of absorbing a larger amount of light in a certain direction than other directions.

The dichroic dye includes an anisotropically absorbing fragment. The dichroic dye included in the anisotropic layer of the optical film has an absolute value of the difference between the refractive index with respect to light that has wavelength within the range of visible light and that has polarized axis in a direction parallel to an optical transition dipole moment of an anisotropically absorbing fragment of the dichroic dye and the refractive index with respect to light that has wavelength within the range of visible light and that has polarized axis in a direction perpendicular to an optical transition dipole moment of an anisotropically absorbing fragment of the dichroic dye of 0.2 or more, preferably 0.3 or more, and more preferably greater than 0.3. The term polarized axis as used herein may refer to a direction of vibration of an electric field in the light. Hereinafter, the absolute value of the difference between refractive indexes, or a physical property corresponding to the absolute value may be simply referred to as "refractive index anisotropy." Also, the term "visible region" as used herein may refer to a wavelength range of light that is visible to the human eye, for example, a wavelength range of from 380 nm to 780 nm, and preferably approximately from 400 nm to 700 nm, or light having the above wavelength range. The refractive index of the dichroic dye with respect to light having polarized axis in a direction parallel to an optical transition dipole moment thereof and the refractive index of the dichroic dye with respect to light having polarized axis in a direction perpendicular to the optical transition dipole moment are different from each other. In the anisotropic layer of the optical film, a dichroic dye, of which an absolute value of the difference between the refractive indexes is 0.2 or more at the entire wavelengths of the visible light, is included. If the dichroic dye having the refractive index anisotropy as described above is aligned in an appropriate direction in at least one anisotropic layer, the anisotropic layer may exhibit a function to selectively transmit or reflect incident light according to the polarized axis of the light. Although not limited in theory, the dichroic dye generally has a relatively high refractive index with respect to light having a polarized axis in a direction parallel to the optical transition dipole moment, and a relatively low refractive index with respect to light having a polarized axis in a direction perpendicular to the optical transition dipole moment. If the difference of the refractive indexes, that is, the refractive index anisotropy, falls within the range as described above, light having a polarized axis parallel to the axis having a high refractive index may be reflected by the anisotropic layer via the total reflection, and light having a polarized axis in a direction perpendicular to the axis at which the total reflection occurs may be transmitted through the anisotropic layer. The higher the value of the refractive index anisotropy is, the more effective selective reflection and transmission characteristics are exhibited by the anisotropic layer. Therefore, the upper limit of the refractive index anisotropy is not particularly limited, but may, for example, be 2.5 or less.

In one embodiment, the optical transition dipole moment or a projection of the optical transition dipole moment on a plane of the anisotropic layer may be parallel to the optical axis of the anisotropic layer or the dichroic dye molecules. The term "optical axis" of the anisotropic layer or the molecules of the dichroic dye as used herein may refer to an optically selected direction in the plane of the anisotropic layer. In one embodiment, the optical axis of the anisotropic layer or the molecules of the dichroic dye may coincide with the coating direction in a coating process for forming the anisotropic layer. FIG. 1 shows a schematic of an illustrative embodiment where the projection of the optical transition dipole moment on the plane of the anisotropic layer is parallel to the optical axis of the anisotropic layer. As shown in FIG. 1, if the optical transition dipole moment is, for example, disposed parallel to the anisotropic layer, the optical transition dipole moment may coincide with the projection. In a desirable embodiment, the optical transition dipole moment may be parallel to the optical axis of the anisotropic layer or molecules of the dichroic dye.

In one embodiment, the molecules of the dichroic dye or at least one anisotropically absorbing fragment of the molecules may have a rod like shape so that the optical transition dipole moment and the optical axis of the anisotropic layer may be disposed parallel to each other.

In the optical film, the dichroic dye is capable of forming a stable lyotropic liquid crystal phase. Therefore, in one embodiment, the anisotropic layer may be formed by aligning a composition including the dichroic dye (hereinafter, it may be referred to as a "lyotropic liquid crystal composition") based on mechanical ordering, which may be realized, for example, by imposing shearing force or under wedging forces arising at separation of one surface from another, between which a layer of the lyotropic liquid crystal composition is distributed, for example as in a method known in U.S. Pat. No. 5,739,296.

The lyotropic liquid crystal phase may be, for example, formed both on the basis of single molecules and/or of molecular associates (complexes) of a dichroic material with low degree of aggregation, and on the basis of supramolecular complexes of the dichroic material.

In one embodiment, the dichroic dye may have a maximum absorption wavelength of 350 nm to 900 nm, preferably 350 nm to 600 nm, and more preferably 440 nm to 500 nm. In this range, for example, the optical film may exhibit excellent performance in the display device.

The dichroic dye may have a molecular weight of 300 g/mol to 900 g/mol, preferably 450 g/mol to 800 g/mol, and more preferably 600 g/mol to 900 g/mol. In this range, the dichroic dye may exhibit a suitable absorption wavelength and also form a stable lyotropic liquid crystal phase.

Among the dichroic dyes that can form the lyotropic liquid crystal phase known in the art, any kind of dichroic dyes having the above characteristics may be used as the dichroic dye without limitation.

In one embodiment, the anisotropic layer may be formed on the basis of at least one salt of dichroic anioinic dye having general formula: $\{Chromogen\}(-X_iO^-M_i^+)_n$ (where Chromogen is a dye chromophore system; $X_i$ is CO, $SO_2$, $OSO_2$ or $OPO(O^-M^+)$; n is a number of from 1 to 10, $M_i^+$ is $H^+$, $M_H^+$ and/or $M_o^+$, wherein $M_H^+$ represents an inorganic cation such as the following type: $NH_4^+$, $Li^+$, $Na^+$, $K^+$, $Cs^+$, ½ $Mg^{++}$, ½ $Ca^{++}$, ½ $Ba^{++}$, ⅓ $Fe^{+++}$, ½ $Ni^{++}$, ½ $Co^{++}$ and the like, $M_o^+$ represents an organic cation such as of the following type: N-alkylpyridinium, N-alkylchinolinium, N-alkylimidazolinium, N-alkylthiazolinium, $OH-(CH_2-CH_2O)_m-CH_2CH_2-NH_3^+$ (where, m is from 1 to 9), $RR'NH_2^+$, $RR'R''NH^+$, $RR'R''R^*N^+$, $RR'R''R^*P^+$ (where, R, R', R'' and R* represent independently substituted or unsubstituted alkyl such as the following type: $CH_3$, $ClC_2H_4$, $C_2H_5$, $C_3H_7$, $C_4H_9$, $C_6H_5CH_2$, or unsubstituted or substituted phenyl or heteroaryl), $YH-(CH_2-CH_2Y)_k-CH_2CH_2$ (where, Y is O or NH, k is a number of from 0 to 10)); at least one associate of a dichroic anionic dye with surface-active cation and/or amphoteric surfactant of general formula: $(M_i^+O-X_i-)_n\{Chromogen\}(-X_jO-SAI_j)_m$ (where, $X_j$ is CO, $SO_2$, $OSO_2$, $OPO(O-M^+)$, n is a number of from 0 to 9, m is a number of from 1 to 4, $Mi^+$ is $H^+$, $M_o^+$ and/or $M_H^+$, $SAI_j$ (hereinafter, it may be referred to as "surface-active ion") is $SAC^+$ and/or AmSAS (where $SAC^+$ is a surface-active cation and AmSAS is an amphoteric surface-active substance), and Chromogen, $X_j$, $M_o^+$ and $M_H^+$ have the same meaning as described above); at least one associate of a dichroic cationic dye with surface-active anion and/or amphoteric surfactant of general formula: $(M_i^+O^-X_i^-)_n\{Chromogen^+\}SAI$ (where, n is a number of from 0 to 5, SAI is $SAA^-$ and/or AmSAS, where $SAA^-$ is a surface-active anion, and Chromogen, $M_i$, $X_i$, and AmSAS have the same meaning as described above); at least one associate of a dichroic cationic dye with surface-active anion and/or amphoteric surfactant of general formula: $\{Chromogen\}(-Z_i^+RR'R''SAI_i)_n$ (where, Z, is N or P; R, R' and R'' are independently alkyl or substituted alkyl of type $CH_3$, $ClC_2H_4$, $HOC_2H_4$, $C_2H_5$, $C_3H_7$; $SAI_i$ is $SAA^-$ or AmSAS; n is a number of from 1 to 4, and Chromogen, $SAA^-$ and AmSAS have the same meaning as described above); at least one salt of dichroic anioinic oligomeric dye having general formula: $([\{-Chromogen\}(-X_iO^-M_i^+)_n]-Li^-)_q$ (where L is $(CH_2)_6$, $C_6H_4$, $C_6H_3G$-$C_6H_3G$, $C_6H3G$-Q-$C_6H_3G$, where G is H, Halogen, OH, $NH_2$, Alkyl and Q is O, S, NH, $CH_2$, CONH, $SO_2$, NH—CO—NH, CH=CH, N=N or CH=N, n is a number of from 1 to 10, q is a number of from 5 to 15, and Chromogen, X, and $M_i$ have the same meaning as described above); and/or at least one water insoluble dichroic dye without inorganic or hydrophilic groups. The dye may include the same ionic groups, for example, $-X_iOM_i^+$, $-X_jO-SAI_j$, $-X_i^+RR'R''$ and/or $M_i^+$, and simultaneously may include several different ionic groups and/or $M_i^+$, including the variant of absence of two identical groups and/or cations. The ionic groups, i.e., $-X_i-OM_i^+$, $-X_jO-SAI_j$, and $-X_i^+RR'R''$ may be linked directly with aromatic ring of Chromogen and/or linked via bridge $-Q_i-(CH_2)_p-$ (where $Q_i$ is $SO_2NH$, $SO_2$, CONH, CO, O, S, NH or $CH_2$, p is a number of from 1 to 10).

In the above, the chromogen may be, for example, a 1,4,5,8-naphthalene-, 3,4,9,10-perylene-, 3,4,9,10-anthanthrone-tetracarboxylic acid chromophore, an azo dye chromophore, an azoxy dye chromophore, a metal complex dye chromophore, an azomethine dye chromophore, a styrene dye chromophore or a polymethine dye chromophore. In another embodiment, the chromogen may be a chromophore selected from at least one dichroic dye or pigment selected from the group consisting of a mono-, bis-, tris-, polyazo- or azoxy-dye, stilbene, azomethine, thiopyronine, pyronine, acridine, anthraquinone, perinone, indigoid, oxazine, aryl carbonium, thiazine, xanthene or an azine dye, a heterocyclic derivative of di- and triarylmethane, a polycyclic or metal complex compound, a heterocyclic derivative of anthrone, or a direct dye having a structure of a mixture thereof, a reactive dye, acid dye, a polymethine dye, a cyanine dye, a hemicyanine dye, a vat dye and a disperse dye.

In the preparation of the optical film, suitable types of dyes may be selected and used among the above dichroic organic dyes.

For the preparation of the above kinds of the dyes, for example, a stilbene dye described in U.S. Pat. Nos. 5,007,942 or 5,340,504; an azo- and metal complex dye described in U.S. Pat. No. 5,318,856; a direct dye such as C.I. Direct Yellow 12, C.I. Direct Yellow 28, C.I. Direct Yellow 44, C.I. Direct Yellow 142, C.I. Direct Orange 6, C.I. Direct Orange 26, C.I. Direct Orange 39, C.I. Direct Orange 72, C.I. Direct Orange 107, C.I. Direct Red 2, C.I. Direct Red 31, C.I. Direct Red 79, C.I. Direct Red 81, C.I. Direct Red 240, C.I. Direct Red 247, C.I. Direct Violet 9, C.I. Direct Violet 48, C.I. Direct Violet 51, C.I. Direct Blue 1, C.I. Direct Blue 15, C.I. Direct Blue 71, C.I. Direct Blue 78, C.I. Direct Blue 98, C.I. Direct Blue 168, C.I. Direct Blue 202, C.I. Direct Brown 106, C.I. Direct Brown 223, or C.I. Direct Green 85; a reactive dye such as C.I. Active Yellow 1, C.I. Active Red 1, C.I. Active Red 6, C.I. Active Red 14, C.I. Active Red 46, C.I. Active Violet 1, C.I. Active Blue 9, or C.I. Active Blue 10; an acid dye such as C.I. Acid Orange 63, C.I. Acid Red 85, C.I. Acid Red 144, C.I. Acid Red 152, C.I. Acid Brown 32, C.I. Acid Violet 50, C.I. Acid Blue 18, C.I. Acid Blue 44, C.I. Acid Blue 61, C.I. Acid Blue 102, or C.I. Acid Black 21; or a cationic dye such as C.I. Basic Red 12, Basic Brown (C.I. 33500) or C.I. Basic Black may be used.

The dichroic dye may be prepared, for example, using a method disclosed in WO 1999-31535 or WO 2000-067069.

In one embodiment, the dichroic dye included in the anisotropic layer may be a dye represented by the following Formula 1.

Formula 1

In Formula 1, Q is a dye chromophore system, A is a single bond, an alkylene group having 1 to 12 carbon atoms, an alkylidene group having 1 to 12 carbon atoms, —$SO_2$NH-T-, —$SO_2$-T-, —CONH-T-, —CO-T-, —O-T-, —S-T- or —NH-T-, where T is an alkylene or alkylidene group having 1 to 10 carbon atoms, R is a moiety in the form of a salt, and n is a number ranging from 1 to 10, which represents the number of A-R groups bound to Q.

In Formula 1, the dye chromophore system may be, for example, a dye chromophore system having a maximum absorption wavelength of 350 nm to 900 nm, preferably 350 nm to 600 nm, and more preferably 440 nm to 500 nm, as described above. Also, the dye chromophore system may be a chromophore having a molecular weight of 300 g/mol to 900 g/mol, preferably 450 g/mol to 800 g/mol, and more preferably 600 g/mol to 900 g/mol.

In Formula 1, the term "single bond" refers to the case where no atom is present in the portion represented by "A," and Q and R are directly bonded. A may preferably be a single bond, an alkylene group having 1 to 8 carbon atoms, or an alkylidene group having 1 to 8 carbon atoms, more preferably a single bond, an alkylene group having 1 to 4 carbon atoms, or an alkylidene group having 1 to 4 carbon atoms, and further preferably a single bond.

Also, the moiety in the form of a salt in Formula 1 may be, for example, moieties included in the above dichroic dye, for example, and preferably —$SO_3^-M^+$ or —$COO^-M^+$. In the above, $M^+$ may be $H^+$; an inorganic cation such as $NH_4^+$, $Li^+$, $Na^+$, $K^+$, $Cs^+$, ½ $Mg^{++}$, ½ $Ca^{++}$, ½ $Ba^{++}$, ⅓ $Fe^{+++}$, ½ $Ni^{++}$ or ½ $Co^{++}$; N-alkylpyridinium, N-alkylquinolinium, N-alkylimidazolium, N-alkylthiazolium, OH—($CH_2$—$CH_2$O)$_m$—$CH_2CH_2$—$NH_3^+$ (where, m ranges from 1 to 9), RR'$NH_2^+$, RR'R"$NH^+$, RR'R"R*$N^+$, RR'R"R*$P^+$ (where, R, R', R" and R* are each independently a substituted or unsubstituted alkyl group such as $CH_3$, $ClC_2H_4$, $C_2H_5$, $C_3H_7$, $C_4H_9$, or $C_6H_5CH_2$, or substituted or unsubstituted phenyl or heteroaryl) or YH—($CH_2$—$CH_2$Y)$_k$—$CH_2CH_2$ (herein, Y is O or NH, and k ranges from 0 to 10). The $M^+$ may preferably be an inorganic cation, more preferably $Li^+$, $Na^+$, $K^+$ or $Cs^+$, and further preferably $Na^+$ or $Li^+$.

In Formula 1, n preferably ranges from 1 to 5, and more preferably from 1 to 3.

The dichroic dye of Formula 1 may more preferably be a compound represented by the following Formula 2.

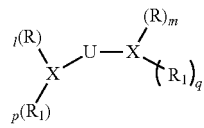

Formula 2

In Formula 2, —U— is —N=N— or —O—($CH_2$)—(CHOH)—($CH_2$)—O—, X is independently an aryl group having 6 to 18 carbon atoms, or a heteroaryl group having 6 to 18 ring-membered atoms, R is as defined in Formula 1, $R_1$ represents a hydroxy group, an alkoxy group having 1 to 12 carbon atoms, a halloalkyl group having 1 to 12 carbon atoms, an oxo group or —N=N-Ph, where Ph is a phenyl group unsubstituted or substituted with an alkoxy group having 1 to 12 carbon atoms, l and m are each independently 1 or 2, which represent the number of R substituted with X, and p and q are each independently from 0 to 2, which represent the number of $R_1$ substituted with X.

In the above, a heteroatom included in the ring-membered atoms of the heteroaryl group may be, for example, N or O, and preferably N. Also, the number of the heteroatom in the ring-membered atoms of the heteroaryl group may be, for example, in a range of 1 to 5, preferably 1 to 3, and more preferably 1 to 2.

In Formula 2, —U— may preferably be —N=N—, X may preferably be an aryl group having 6 to 12 carbon atoms or a heteroaryl group having 6 to 12 ring-membered atoms, and more preferably an aryl group having 6 to 12 carbon atoms, $R_1$ may preferably be a hydroxy group, an alkoxy group having 1 to 8 carbon atoms, a halloalkyl group having 1 to 8 carbon atoms, an oxo group or —N=N-Ph (where, Ph is a phenyl group unsubstituted or substituted with at least one alkoxy group having 1 to 8 carbon atoms), and more preferably a hydroxy group, an alkoxy group having 1 to 4 carbon atoms, a halloalkyl group having 1 to 4 carbon atoms, an oxo group or —N=N-Ph (where, Ph is a phenyl group unsubstituted or substituted with at least one alkoxy group having 1 to 4 carbon atoms), l and m are each independently 1, and p and q are each independently 0 or 1.

If the dyes as described above are used, it may be possible to regulate hydrophobic-hydrophilic balance of a dichroic dye molecule which is a very important factor besides purity of dyes for forming of lyotropic liquid crystal phase and for variation of the colloidal-chemical including structural and rheological properties of the lyotropic liquid crystal compositions based on dichroic dye. Variation of solubility and hydrophobic-hydrophilic balance allows regulating both the process of formation and type of lyotropic liquid crystal phase that influences therefore the degree of molecular orderness and consequently polarization parameters of the anisotropic layer formed after deposition of the lyotropic liquid crystal composition on a substrate surface with subsequent removing of solvent.

The properties of the dyes and the lyotropic liquid crystal composition may be effectively regulated in case where the dyes have more than two ionic groups. In this case, it is possible to use at least two different cations and each cation provides those or diverse properties. For example, combination of cation $Li^+$, which may provide raised solubility, with triethanolammonium cation, which may decrease degree of aggregation of dye molecules, and with tetra-butylammonium cation which may stabilize lyotropic liquid crystal phase may allow to prepare lyotropic liquid crystal composition based on single molecules and/or molecular dye associates (complexes) of low association degree. If the dye has linear molecules structure, promoting formation of nematic lyotropic liquid crystal phase and providing more high degree of alignment by formation of the anisotropic layer may become possible, and as a result of that, more effective selective reflection and transmission of electromagnetic radiation may be provided.

Also, addition of polyvalent cation such as ½ $Mg^{++}$, ½ $Ca^{++}$ or ½ $Ba^{++}$ may enhance the degree of aggregation in the molecular complex, and induce formation of a lyotropic liquid crystal phase of a supermolecular complex having a high degree of aggregation, for example, an aggregation of greater than 50, and the solubility of the polyvalent cation may be increased using surface-active ions.

The lyotropic liquid crystal composition may be obtained from at least one selected from the group consisting of aqueous, aqueous-organic and organic solutions of suitable dyes by gradual increase of concentration of dilute solutions (for example, by vaporization or membrane ultrafiltration), or by dissolution dry dyes in appropriate solvent (water, mixture of water with alcohols, bipolar aprotic solvents such as DMFA (dimethyl formamide) or DMSO (dimethyl sulfoxide), cellosolves, ethyl acetate and other solvents miscible with water) up to necessary concentration, at which one random mutual position of dyes molecules or supramolecular complexes becomes impossible and they have to acquire an ordered liquid crystal state. The dye concentration in the lyotropic liquid crystal composition is varied from approximately 0.5 weight % to approximately 30 weight %, preferably from approximately 0.5 weight % to approximately 20 weight %, and more preferably from approximately 0.5 weight % to approximately 15 weight %.

In order to regulate colloidal-chemical properties of the lyotropic liquid crystal, the composition may further include at least one additives and modifier such as non-ionogenic and/or ionogenic surfactants, binder and film-forming reactants (polyvinylalcohol, polyvinylpyrrolidone, polyacrylic acid and its ethers, polyacrylamide, polyethylene oxide and polyethyleneglycols, polypropyleneglycol and their co-polymers, ethyl- and hydroxypropyl ethers of cellulose, sodium salt of carboxymethylcellulose, and the like) along with the solvents. The composition may further include hydrotropic additives from the series of amides, for example, dimethyl form amide, dimethylsulfoxide, alkylamide of phosphoric acid, carbamide and its N-substituted derivatives, N-alkylpyrrolidone, dicyandiamide and their mixtures and mixture of amides with glycols. The use of appropriate additives may allow not only to increase stability of the compositions but also to regulate the processes of dye molecules aggregation and consequently the process of lyotropic liquid crystal phase formation. Thus, addition of hydrotropic additive may allow to prepare the lyotropic liquid crystal composition based on single dye molecules.

As a result, the anisotropic layer may further include additionally not more than 50 weight % of modifying agents of different type, for example a stabilizer of light and/or hydrophilic, and/or hydrophobic polymers of different type including liquid crystal, silicone, and/or plasticizer, and/or lacquers, and/or non-ionogenic and/or ionogenic surfactants.

For forming of the anisotropic layer, a lyotropic liquid crystal composition having a local aligning may be deposited on a substrate surface using known methods, for example, a method disclosed in U.S. Pat. No. 5,739,296. Under action of external aligned influence, the lyotropic liquid crystal composition acquires a macroscopic alignment at which a dipole moment of optical transition dye molecules or their anisotropically absorbing fragments are homogeneously aligned with respect to direction which may be predetermined either by direction of mechanical alignment or by surface anisotropy, or by influence of magnetic and electromagnetic fields. During the process of solidification (by solvent removing or by temperature decreasing) the molecules alignment may be not only well preserved but also increased because of crystallization.

In another embodiment, alignment of the lyotropic liquid crystal composition on a substrate surface under action of a shearing force may be realized by deposition of lyotropic liquid crystal composition using a die or doctor blade, which may be a knife-blade or a cylindrical type blade. One of the methods for preparation of the anisotropic layer based on the dye comprising different cations may provide treatment of formed layer with a solution of barium, calcium or magnesium chloride. By this treatment, the anisotropic layer including simultaneously cations of lithium, sodium, potassium, ammonium, ethanolammonium, alkylammonium, barium, calcium or magnesium, and the like may be obtained In one embodiment, the anisotropic layer may be formed with a multilayer structure. In this case, the dichroic dye included in each layer may have different maximum absorption wavelengths. Therefore, the anisotropic layer may exhibit selective transmission and reflection properties with respect to light of broader band wavelengths. In one embodiment, the anisotropic layer may include a first anisotropic layer including a first dichroic dye capable of forming a lyotropic liquid crystal phase and having a maximum absorption wavelength of 600 nm to 700 nm, and a second anisotropic layer including a second dichroic dye capable of forming a lyotropic liquid crystal phase and having a maximum absorption wavelength of 400 nm to 550 nm. In case where the anisotropic layer is formed as the multilayered structure, the relationship between the optical transition dipole moment of the anisotropically absorbing fragment or the projection thereof and the optical axis may be controlled as described above. Also, the anisotropic layer may have a multilayered structure including at least three layers.

In one embodiment, the anisotropic layer may have a thickness of 10 nm to 500 nm, and preferably 10 nm to 300 nm. In this thickness range, the anisotropic layer may show the effective selective light transmission and reflection characteristics. As described above, when the anisotropic layer includes a plurality of layers, the sum of thicknesses of the plurality of layers may be included in this thickness range.

In one embodiment, the film may further include a substrate, and the anisotropic layer may be formed on the substrate. FIG. 2 shows a schematic of an illustrative embodiment of the film 1, in which the anisotropic layer 11 is formed on the substrate 12.

An optically transparent substrate may be used as the substrate. Also, a substrate having the refractive index of not less than 1.4 and also less than 1.59, preferably 1.4 to 1.55, and more preferably 1.45 to 1.55 with respect to light of 550 nm wavelength may, for example, be used as the substrate in an aspect of selective transmission and reflection performance according to the polarized axis. In one embodiment, an optically transparent plastic film or sheet or glass may be used as the substrate. Examples of the plastic film or sheet may include a cellulose film or sheet such as a diacetyl cellulose (DAC) or a triacetyl cellulose (TAC) film or sheet; a cycloolefin copolymer (COP) film or sheet such as a norbornene derivative resin film or sheet; an acryl film or sheet such as a poly(methyl methacrylate) (PMMA) film or sheet; a polycarbonate (PC) film or sheet; an olefin film or sheet such as a polyethylene (PE) or polypropylene (PP) film or sheet; a polyvinyl alcohol (PVA) film or sheet; a polyethersulfone (PES) film or sheet; a polyetheretherketone (PEEK) film or sheet; a polyetherimide (PEI) film or sheet; a polyethylenenaphthatlate (PEN) film or sheet; a polyester film or sheet such as a polyethyleneterephtalate (PET) film or sheet; a polyimide (PI) film or sheet; a polysulfone (PSF) film or sheet; a polyarylate (PAR) film or sheet or a fluororesin film or sheet. Generally, a cellulose film or sheet, a polyester film or sheet or an acryl film or sheet may be used as the plastic film or sheet, while the TAC film or sheet is preferred, but is not limited thereto. The thickness of the substrate may be adjusted to a range, for example, of 20 μm to 150 μm.

Also, the optical film may further include a hard coating layer formed on the anisotropic layer. The hard coating layer may be formed of a material showing optical isotropy. In one embodiment, the hard coating layer may have a refractive index of not less than 1.4 and also less than 1.59, preferably 1.4 to 1.55, and more preferably 1.45 to 1.55 in an aspect of selective transmission and reflection performance according to the polarized axis. FIG. 3 shows a schematic of an illustrative embodiment of the film 2, in which the hard coating layer 21 is formed on the anisotropic layer 11 of the film 1 in FIG. 2. Also, FIG. 4 shows another schematic of an illustrative embodiment of the film 3, in which the anisotropic layers 111 and 112 are formed as multilayered structure, and the hard coating layers 211 and 212 is formed between the anisotropic layers 111 and 112 or formed on the anisotropic layers 111 and 112.

The hard coating layer may, for example, be suitably selected from and formed of materials known in the art that show optical isotropy and have a refractive index within the range as described above. For example, the hard coating layer may be formed by using a UV-curable resin composition or a thermcurable resin composition, and more particularly formed by using an acrylic resin composition, a urethane resin composition, a melamine resin composition, a composition including an organic silicate compound, a composition including a silicon resin, or a combination of at least two thereof. The thickness of the hard coating layer may be selected from a range of, for example, 50 nm to 200 nm.

In still another embodiment, a reflective polarizing plate including a polarizer; and the anisotropic layer as described above, i.e., the anisotropic layer that comprises a dichroic dye capable of forming a lyotropic liquid crystal phase. In the above, an absolute value of the difference between the refractive index with respect to light that has wavelength within the range of visible light and that has polarized axis in a direction parallel to an optical transition dipole moment of an anisotropically absorbing fragment of the dichroic dye and the refractive index with respect to light that has wavelength within the range of visible light and that has polarized axis in a direction perpendicular to an optical transition dipole moment of an anisotropically absorbing fragment of the dichroic dye is 0.2 or more. Also, the anisotropic layer may be disposed on one surface of the polarizer.

The detailed description regarding the anisotropic layer in the reflective polarizing plate may be applied in the same manner as described above.

A conventional polarizer known in the art may be used as the polarizer. For example, an elongated polymer film dyed with an iodine compound or an organic dye, for example, a polyvinyl alcohol film, may be used as the polarizer. Such a polarizer may generally have an optical transmission axis and an optical absorption axis perpendicular to the transmission axis. Also, a protective film for a polarizer, such as a TAC sheet known in the art, may, for example, be attached to one surface or both surfaces of the polarizer.

In the reflective polarizing plate, the optical transition dipole moment of the dichroic dye included in the anisotropic layer or the projection of the optical transition dipole moment onto the anisotropic layer may be parallel to the optical absorption axis of the polarizer.

The reflective polarizing plate may further include a protective film, and the protective film may be formed between the polarizer and the anisotropic layer, or formed on a surface of the anisotropic layer opposite to a surface of the polarizer. As the protective film, for example, the same kinds of film or sheets used as the substrate of the optical film may be used.

FIG. 5 shows a schematic of an illustrative embodiment of the reflective polarizing plate. The reflective polarizing plate may further include a protective film, and has a structure in which the polarizer 41, the protective film 12 and the anisotropic layer 11 are sequentially formed. As shown in FIG. 5, the reflective polarizing plate may further include a hard coating layer 21 formed on a surface of the anisotropic layer 11 opposite to a surface of the protective film 12. In this case, the hard coating layer 21 may, for example, be the same kind of hard coating layer as described in connection to the optical film.

FIG. 6 shows another schematic of an illustrative embodiment of a structure of the reflective polarizing plate. The reflective polarizing plate may further include a protective film 12, and has a structure in which the polarizer 41, the anisotropic layer 11 and the protective film 12 are sequentially formed.

The reflective polarizing plate may also have a structure as shown in FIG. 7 or 8. FIGS. 7 and 8 show that an optical film including the anisotropic layer is attached to a protective film 61 for a polarizer formed on one surface of the polarizer 41 using a pressure-sensitive adhesive or adhesive 62.

In this case, the kind of adhesive or pressure-sensitive adhesive for attaching the optical film is not particularly limited, and conventional adhesives known in the art may be used without limitation.

In one embodiment, in case where the anisotropic layer included in the reflective polarizing plate has the multilayered structure as described above, a layer including the dichroic dye having a relatively longer maximum absorption wavelength may be preferably disposed closer to the polarizer in the multilayer structure. For example, if the anisotropic layer includes a first anisotropic layer including a first dichroic dye capable of forming a lyotropic liquid crystal phase and having a maximum absorption wavelength of 600 nm to 700 nm, and a second anisotropic layer including a second dichroic dye capable of forming a lyotropic liquid crystal phase and having a maximum absorption wavelength of 400 nm to 550 nm, the first anisotropic layer may be disposed closer to the polarizer than the second anisotropic layer.

In still another embodiment, a display device including the optical film or the reflective polarizing plate as described above may be provided.

In one embodiment, the display device may be a liquid crystal display. As shown in FIG. 9, the liquid crystal display 8 may, for example, be configured to include a liquid crystal panel 81 having polarizing plates 82 and 83 attached to upper and lower portions thereof; and a light source 84 formed at a lower portion of the lower polarizing plate 83 of the liquid crystal panel 81. In such a structure, for example, when the optical film is included in the display device, the film may be disposed between the lower polarizing plate 83 and the light source 84. Also, when the reflective polarizing plate is included in the display device, the reflective polarizing plate may be included in the display device instead of the lower polarizing plate 83. In this case, the polarizer of the reflective polarizing plate may be disposed closer to the liquid crystal panel than the anisotropic layer.

In such a disposition structure, the anisotropic layer of the reflective polarizing plate or the optical film may transmit some of light emitted from a light source 84, for example, light having a polarized axis in a direction parallel to the optical absorption axis of the upper polarizing plate 82, and send the light toward the polarizer, and the other light, for example, light having a polarized axis in a direction parallel to the optical transmission axis of the upper polarizing plate 82, may be reflected again toward the light source 84. The reflected light may be reflected and sent upwards. Also, the polarization characteristics of the reflected light are changed while the reflected light is re-reflected. Then, the reflected light may be incident again to the reflective polarizing plate 83, thereby improving the brightness characteristics of the display device.

Specific kinds, structures and components of the display device are not particularly limited, but the display device including the reflective polarizing plate or the optical film may be applied to all the contents known in the art.

BRIEF DESCRIPTION OF THE DRAWINGS

The above and other objects, features and advantages of the present invention will become more apparent to those of ordinary skill in the art by describing in detail exemplary embodiments thereof with reference to the adhered drawings, in which.

DETAILED DESCRIPTION OF EXEMPLARY EMBODIMENTS

Hereinafter, the present invention will be described with reference to examples and comparative examples in detail. However, the present invention is not limited to these examples.

EXAMPLE 1

Preparation of Lyotropic Liquid Crystal Composition (Coating Solution)

A lyotropic liquid crystal composition was prepared using a dichroic dye, which was prepared by replacing the cations in the dye known as Direct Yellow 12 in the art from $Na^+$ to $Li^+$, as a dichroic dye capable of forming a stable lyotropic liquid crystal phase. The minimum value of the refractive index anisotropy of the dichroic dye, in which cations were replaced with $Li^+$, i.e., the minimum value of the absolute value of the difference between the refractive index with respect to light that has wavelength within the range of visible light and that has polarized axis in a direction parallel to an optical transition dipole moment of an anisotropically absorbing fragment of the dichroic dye and the refractive index with respect to light that has wavelength within the range of visible light and that has polarized axis in a direction perpendicular to an optical transition dipole moment of an anisotropically absorbing fragment of the dichroic dye was 0.3. The dichroic dye exhibited the largest refractive index anisotropy at wavelengths of around 530 nm, and the largest refractive index anisotropy was approximately 1.8. The refractive index anisotropy of the dichroic dye was measured using an Ellipsometer. The dichroic dye was dissolved in distilled water to a concentration of approximately 1 weight %, and ethylene glycol was also dissolved therein to prepare a lyotropic liquid crystal composition.

Formation of Anisotropic Layer

The lyotropic liquid crystal composition was applied to one surface of a TAC film (the refractive index at 550 nm wavelength: approximately 1.48, thickness: 80 μm) to a thickness of approximately 200 nm under a suitable shearing force, and dried at 100° C. for 2 minutes to form an anisotropic layer.

Preparation of Reflective Polarizer

Figure 1:
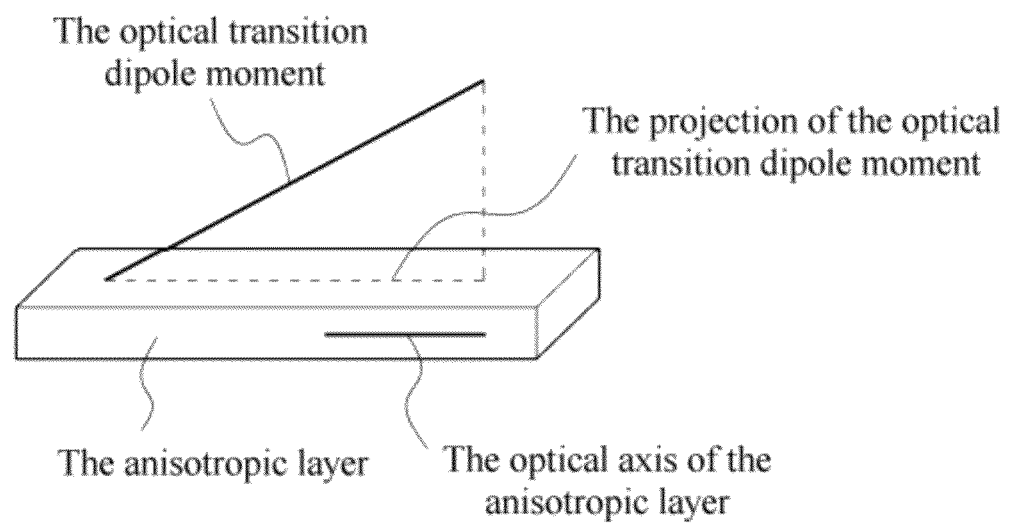
FIG. 1 shows a schematic of an illustrative embodiment of the relationship between the projection of the optical transition dipole moment and the optical axis of an anisotropic layer.
Figure 2:
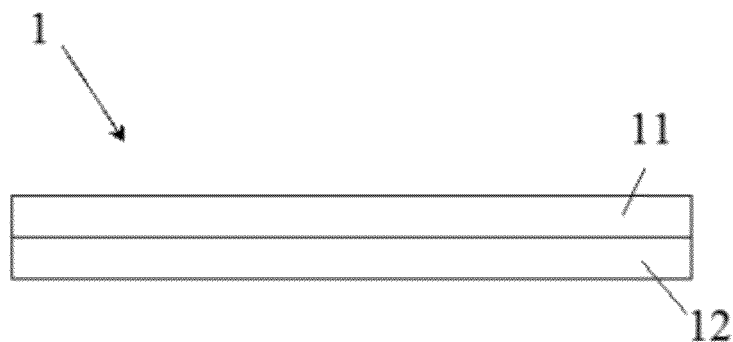
FIGS. 2 to 4 show schematics of various illustrative embodiments of the optical film.
Figure 3:
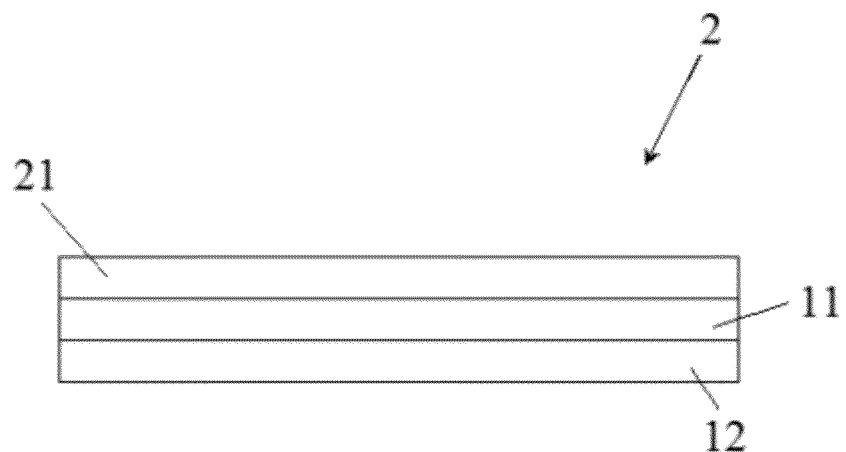
Figure 4:
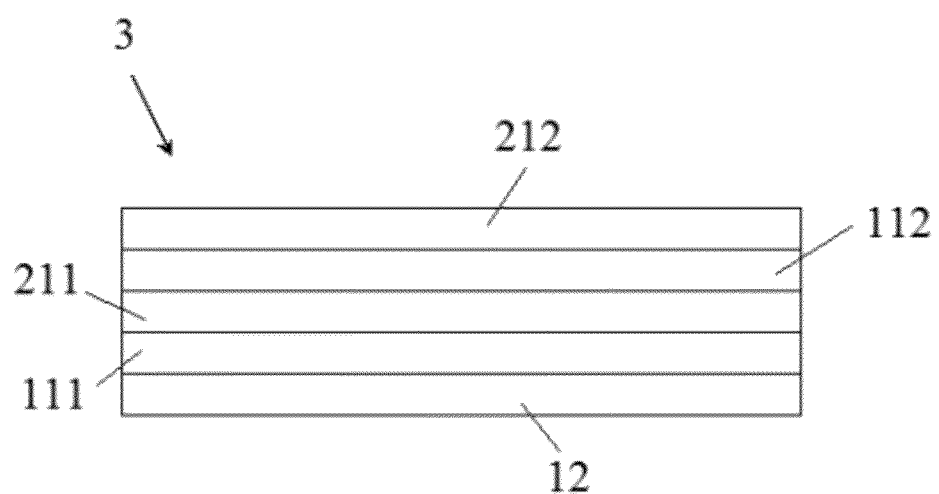
Figure 5:
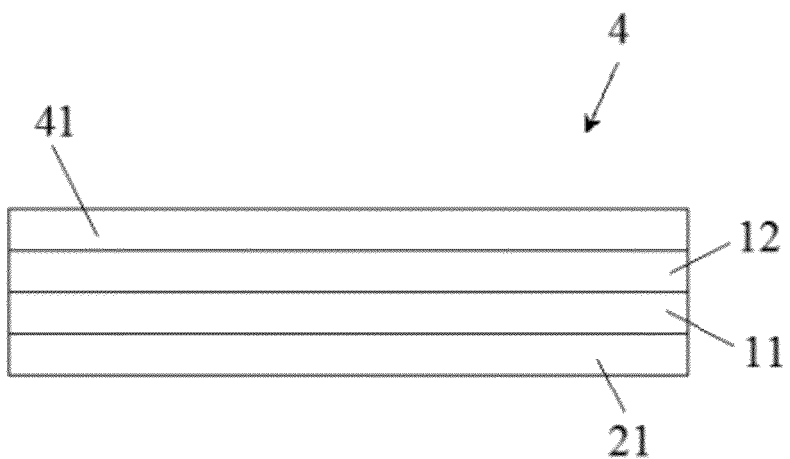
FIGS. 5 to 8 show schematics of various illustrative embodiments of the reflective polarizing plate.
Figure 6:
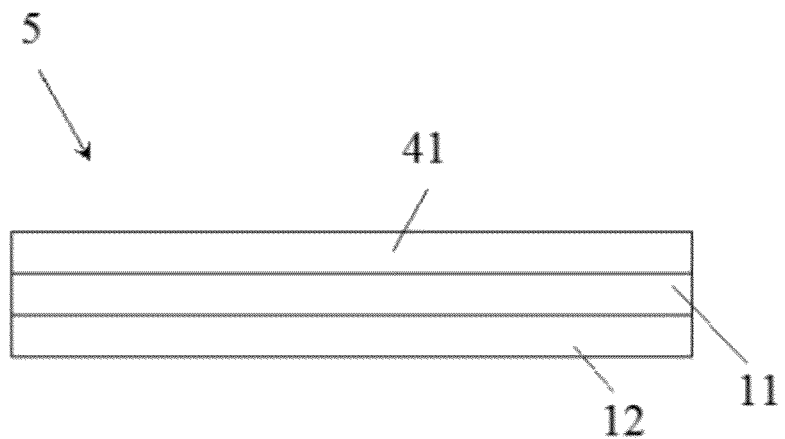
Figure 7:
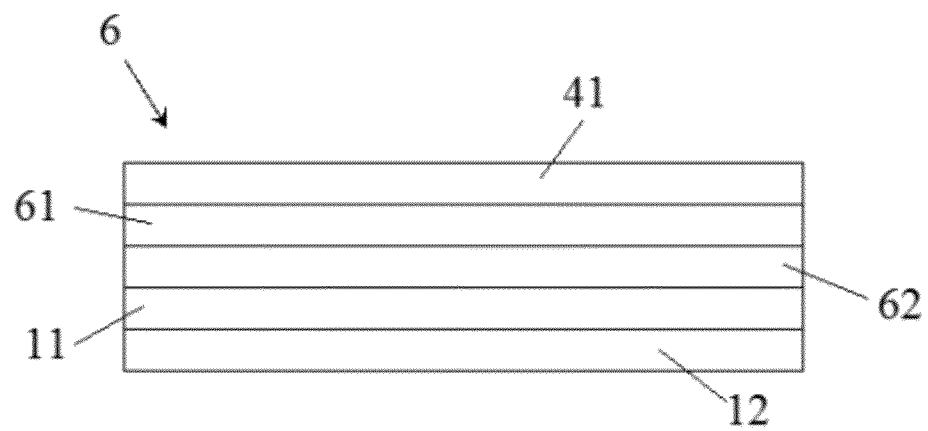
Figure 8:
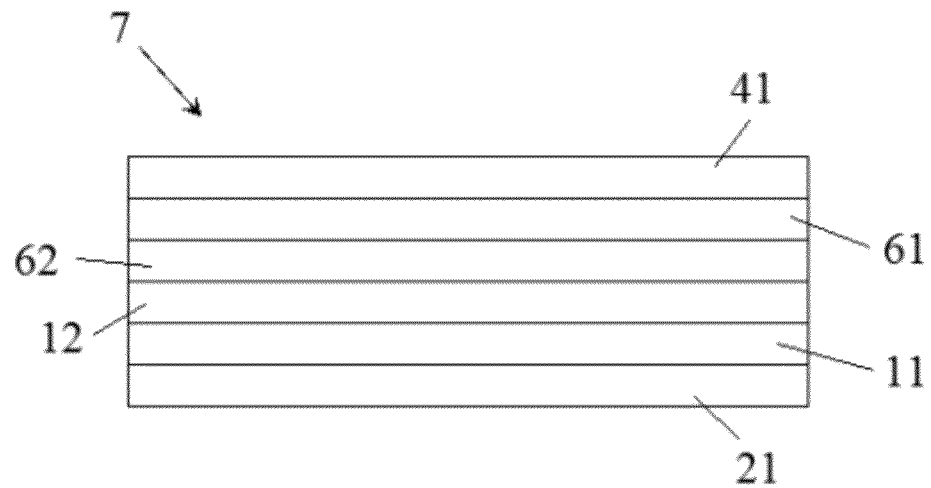
Figure 9:
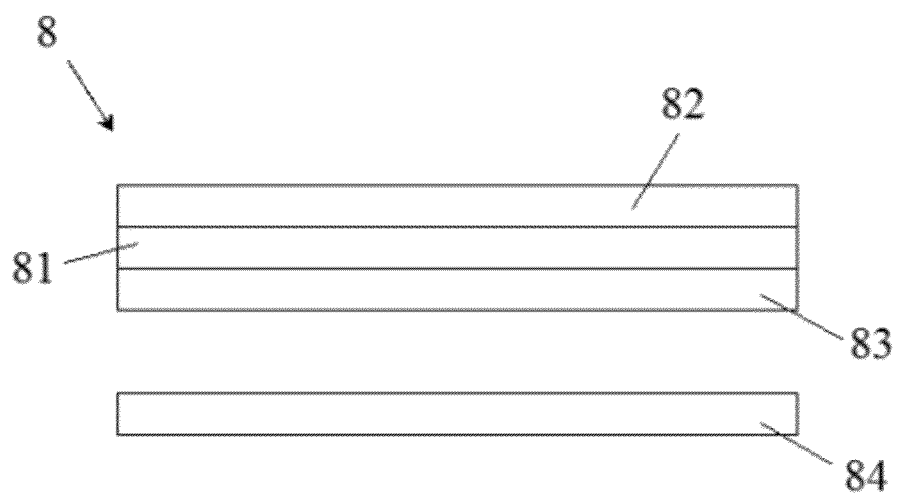
FIG. 9 shows a schematic of an illustrative embodiment of the display device.
Figure 10:
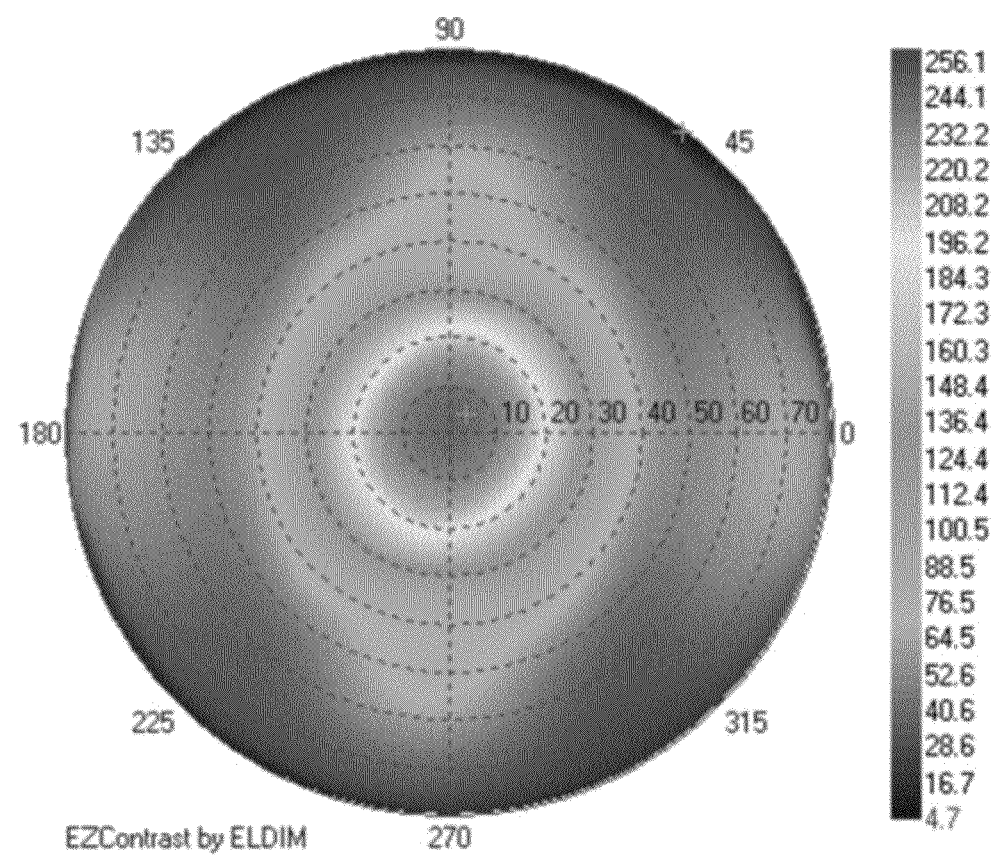
FIGS. 10 to 12 are diagrams showing the brightness characteristics of films of Examples and Comparative Example.

The TAC film, on which the anisotropic layer was formed, was attached to a polyvinyl alcohol polarizer to prepare a reflective polarizing plate. They were attached so that the optical absorption axis of polarizer was disposed to be parallel to the coating direction in a process of forming the anisotropic layer. Then, the prepared reflective polarizing plate was disposed at one surface of the liquid crystal panel of the liquid crystal display, and the liquid crystal display was evaluated for brightness characteristics. In the above, the reflective polarizing plate was disposed at a surface of the liquid crystal panel to which light was incident from a light source. In this case, the anisotropic layer was disposed closer to the light source than the polarizer. The results of evaluation of the brightness characteristics are shown in FIG. 10. The above evaluation of the brightness characteristics was performed according to the manufacturer's manual using EZ-contrast equipment (Eldim).

EXAMPLE 2

Figure 11:
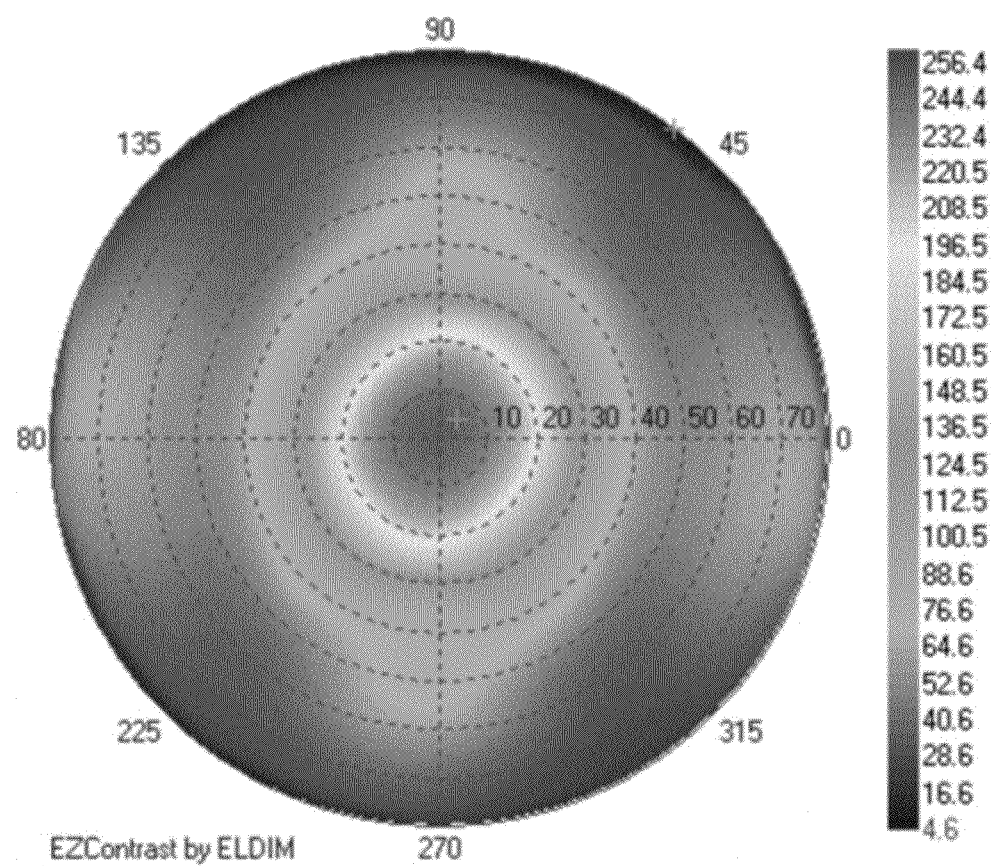

A reflective polarizing plate was prepared in the same manner as in Example 1, except that the anisotropic layer formed on the TAC film was attached to the polyvinyl alcohol polarizer, and the brightness characteristics were evaluated in the same manner as in Example 1. The results are shown in FIG. 11.

COMPARATIVE EXAMPLE 1

Figure 12:
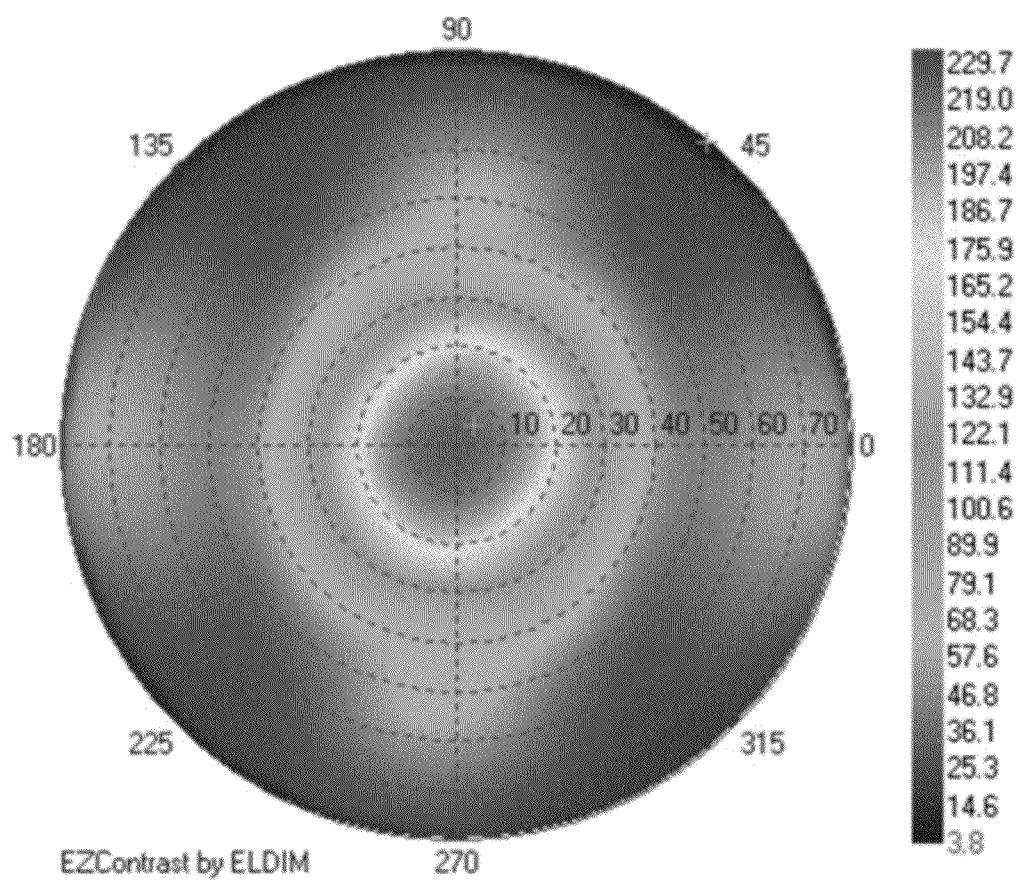

The same polyvinyl alcohol polarizer as used in Example 1, to which the anisotropic layer was not formed, was evaluated for brightness characteristics in the same manner as in Example 1. The results are shown in FIG. 12.

For example, the optical film may be used in the reflective polarizing plate which may enhance the efficiency of light utilization of a display device such as a liquid crystal display device and improve the brightness.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A liquid crystal display, comprising:
    a liquid crystal panel having an upper polarizing plate and a lower polarizing plate which are attached to upper and lower portions of the liquid crystal panel, respectively; and
    a light source formed at a lower portion of the lower polarizing plate of the liquid crystal panel,
    wherein the lower polarizing plate is a reflective polarizing plate, comprising:
    a polarizer having an optical transmission axis and an optical absorption axis perpendicular to the transmission axis; and
    an optical film comprising an anisotropic layer that comprises a dichroic dye capable of forming a lyotropic liquid crystal phase,
    wherein an absolute value of the difference between the refractive index with respect to light that has wavelength within the range of visible light and that has polarized axis in a direction parallel to an optical transition dipole moment of an anisotropically absorbing fragment of the dichroic dye and the refractive index with respect to light that has wavelength within the range of visible light and that has polarized axis in a direction perpendicular to an optical transition dipole moment of an anisotropically absorbing fragment of the dichroic dye is 0.2 or more;
    wherein light having a polarized axis in a direction parallel to the optical transition dipole moment is reflected by the anisotropic layer, and light having polarized axis in a direction perpendicular to the optical transition dipole moment is transmitted through the anisotropic layer; and
    wherein the optical transition dipole moment of the dichroic dye or a projection of the optical transition dipole moment on the anisotropic layer plane is parallel to the optical absorption axis of the polarizer.

2. The liquid crystal display according to claim 1, wherein the optical transition dipole moment or a projection of the optical transition dipole moment on the anisotropic layer plane is parallel to the optical axis of the dichroic dye or the anisotropic layer.

3. The liquid crystal display according to claim 1, wherein the optical transition dipole moment is parallel to the optical axis of the dichroic dye or the anisotropic layer.

4. The liquid crystal display according to claim 1, wherein the dichroic dye has a maximum absorption wavelength within from 350 nm to 900 nm.

5. The liquid crystal display according to claim 1, wherein the dichroic dye has a molecular weight of 300 g/mol to 900 g/mol.

6. The liquid crystal display according to claim 1, wherein the dichroic dye is represented by the following Formula 1:

Formula 1 wherein Q is a dye chromophore system, A is a single bond, an alkylene group having 1 to 12 carbon atoms, an alkylidene group having 1 to 12 carbon atoms, —SO2NH-T-, —SO2-T-, —CONH-T-, —CO-T-, —O-T-, —S-T- or —NH-T-, where T is an alkylene or alkylidene group having 1 to 10 carbon atoms, R is a moiety in the form of a salt, and n is a number ranging from 1 to 10, which represents the number of A-R groups bound to Q.

7. The optical film according to claim 6, wherein the moiety in the form of a salt is —SO3-M+ or —COO-M+, where M+ represents an inorganic cation.

8. The liquid crystal display according to claim 1, wherein the dichroic dye is represented by the following Formula 2:

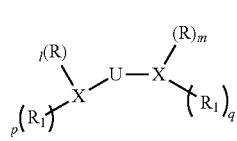

Formula 2 wherein —U— is —N=N— or —O—(CH2)-(CHOH)—(CH2)-O—, X is independently an aryl group having 6 to 18 carbon atoms or a heteroaryl group having 6 to 18 ring-membered atoms, R is a moiety in the form of a salt, R1 represents a hydroxy group, an alkoxy group having 1 to 12 carbon atoms, a halloalkyl group having 1 to 12 carbon atoms, an oxo group or —N=N-Ph, where Ph is a phenyl group unsubstituted or substituted with at least one alkoxy group having 1 to 12 carbon atoms, l and m are each independently 1 or 2, which represent the number of R substituted with X, and p and q are each independently from 0 to 2, which represent the number of R1 substituted with X.

9. The liquid crystal display according to claim 1, wherein the anisotropic layer comprises a first anisotropic layer comprising a first dichroic dye capable of forming a lyotropic liquid crystal phase and having a maximum absorption wavelength of 600 nm to 700 nm; and a second anisotropic layer comprising a second dichroic dye capable of forming a lyotropic liquid crystal phase and having a maximum absorption wavelength of 400 nm to 550 nm.

10. The liquid crystal display according to claim 1, wherein the optical film further comprises a substrate and the anisotropic layer is formed on the substrate.

11. The liquid crystal display according to claim 10, wherein the substrate has a refractive index of not less than 1.4 and less than 1.59 with respect to light having a wavelength of 550 nm.

12. The liquid crystal display according to claim 1, further comprising a hard coating layer formed on the anisotropic layer.

13. The liquid crystal display according to claim 12, wherein the hard coating layer has a refractive index of not less than 1.4 and less than 1.59 with respect to light having a wavelength of 550 nm.

14. The liquid crystal display according to claim 1, wherein the anisotropic layer comprises a first anisotropic layer comprising a first dichroic dye capable of forming a lyotropic liquid crystal phase and having a maximum absorption wavelength of 600 nm to 700 nm; and a second anisotropic layer including a second dichroic dye capable of forming a lyotropic liquid crystal phase and having a maximum absorption wavelength of 400 nm to 550 nm, and the first anisotropic layer is disposed closer to the polarizer than the second anisotropic layer.

15. The liquid crystal display according to claim 1, wherein the polarizing plate further comprises a protective film, and has a structure in which the polarizer, the protective film and the anisotropic layer are sequentially disposed.

16. The liquid crystal display according to claim 15, further comprising a hard coating layer formed at a surface of the anisotropic layer opposite to a surface of the protective film.

17. The liquid crystal display according to claim 1, wherein the polarizing plate further comprises a protective film, and has a structure in which the polarizer, the anisotropic layer and the protective film are sequentially disposed.

* * * * *